April 30, 1946.　　　F. R. FORD　　　2,399,175

DUPLICATING MACHINE

Filed June 15, 1944

INVENTOR
Frank Ronald Ford

BY
ATTORNEY.

Patented Apr. 30, 1946

2,399,175

UNITED STATES PATENT OFFICE 2,399,175

DUPLICATING MACHINE

Frank Ronald Ford, Sparkbrook, Birmingham, England

Application June 15, 1944, Serial No. 540,484
In Great Britain March 20, 1943

7 Claims. (Cl. 101—132)

This invention relates to duplicating machines of the type in which a copy sheet and a master sheet bearing in reverse script the matter to be reproduced, are passed in pressure contact between a pair of rollers, the leading edge of said master sheet being secured to one of said rollers (hereinafter termed the cylinder), and said copy sheet being moistened before contact therewith.

The invention has particular reference to machines of the type described in my prior U. S. A. specifications, Nos. 1,982,017 and 2,048,543. In such machines, the spindle of the second roller (hereinafter termed the pressure roller) is supported in bearings which are movably mounted on the machine frame, these bearings being operatively connected to crank arms on a shaft which can be oscillated to move the pressure roller out of contact with the cylinder whenever it is desired to attach a master sheet to the latter.

In such machines means are provided for rocking the shaft and for retaining it in various adjusted positions each giving a different pressure on the cylinder by the pressure roller.

The object of the present invention is to provide an improved construction.

According to the present invention, the connection between the crank arms and the bearings comprises in each case a rod having an operative engagement with the bearing and adapted to slide through a trunnion carried by the crank arm, a spring on the rod acting between the trunnion and an abutment on the rod above the trunnion, in a manner to move the pressure roller towards the cylinder, and a second spring on the rod acting between the frame or base of the machine and a second abutment on the rod at the side of the trunnion remote from the first abutment.

Referring to the drawing.

Figure 1:
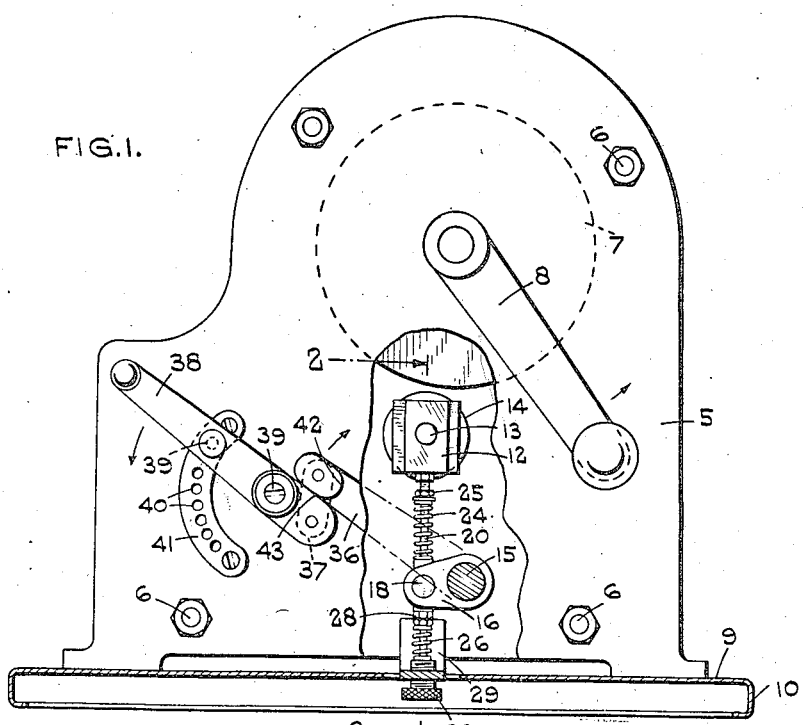
Figure 1 is a part-sectional side elevation of a duplicating machine arranged as hereinafter described.
Figure 2:
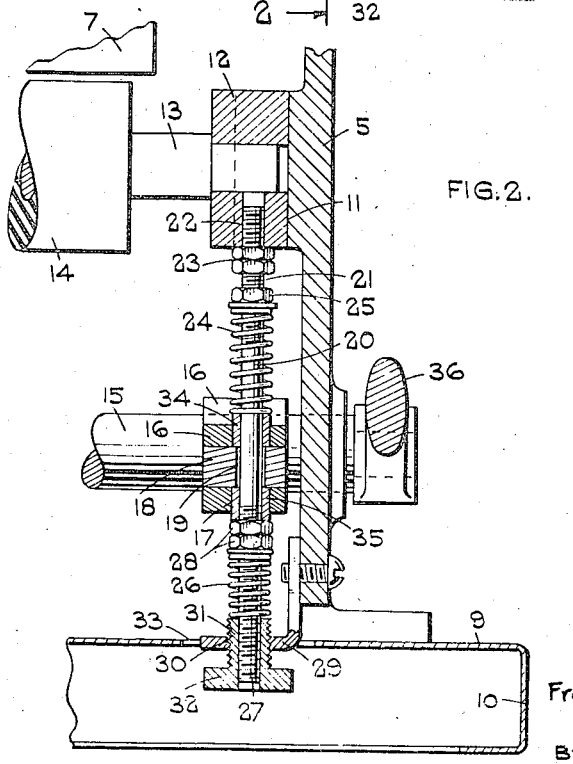
Figure 2 is a section to an enlarged scale on the line 2—2 of Figure 1.

In the construction illustrated, the duplicating machine has a rigid frame comprising a pair of side members 5 connected in spaced relationship by tie-bars 6. Rotatably mounted between these side members 5 with its axis disposed transversely of the frame, is a cylinder 7 adapted to be rotated by an external crank 8. The machine as a whole is conveniently mounted on a base 9 which may be formed as a metal plate having a downwardly directed peripheral flange 10.

The inner faces of the side members 5 are formed with vertical guides 11 in which are slidably mounted bearings 12 carrying the ends of the spindle 13 of a pressure roller 14, the latter being disposed below the cylinder 7 with its axis parallel thereto.

A shaft 15, which also extends parallel to the cylinder 7 but at a lower level than the pressure roller 14, is oscillatably mounted in the side members 5, and is provided beneath each of the bearings 12 with a crank arm 16.

The end of each crank arm 16 is slotted in a vertical plane, as at 17, and drilled horizontally to receive a trunnion 18, the latter having a diametrical clearance hole 19 through which extends a vertical rod 20 having its upper end connected to the adjacent bearing 12.

Conveniently the rod 20 has its upper portion 21 screw threaded to engage a tapped hole 22 in the bearing 12 and provided with lock nuts 23 engaging the underside of the latter. Alternatively, the end of the rod 20 above the nuts 23 may engage in a plain clearance hole in the bearing 12.

A helical compression spring 24 is mounted on the rod 20 above the trunnion 18 and acts between the latter and a suitable abutment on the rod. Preferably such abutment is adjustment on the rod. Preferably such abutment is adjustment and may be constituted by a nut 25 on the threaded upper portion 21 of the rod 20.

The lower portion of the rod 20 below the trunnion 18 carries a second helical compression spring 26 which acts between two abutments, one on the rod 20 and the other on the base 9 or frame of the machine.

In the convenient arrangement shown, the lower portion of the rod 20 is screw threaded at 27 and a pair of lock nuts 28 thereon constitute the first of the abutments just mentioned, whilst the second abutment takes the form of a bracket 29 integral with or secured to the adjacent side members 5 of the frame and having a hole 30 therein, through which the rod 20 passes. Preferably the hole 30 is tapped to receive a screwed sleeve 31 which forms a guide for the rod and which has a knurled or milled head 32 at its lower end.

This sleeve 31 is illustrated as projecting through a hole 33 in the base 9 of the machine, but it will be understood that if desired the lower end of the rod 20 may be guided in the base 9 itself or in an adjustable sleeve carried thereby.

Preferably, tubular distance pieces 34, 35 are placed slidably on the rod 20 between the trunnion 18 and the upper and lower springs 24, 26.

The operating means for the crank arm shaft 15 may comprise an actuating lever 36 fixed thereon externally of one of the frame side members 5, and having its free end connected by a link 37 to a separate operating lever 38 which is pivoted at 39 to the side member 5.

The machine is illustrated with this lever 38 in one of its extreme positions and lying substantially parallel to the lever 36, the arrangement being such that in this position of the lever 38, the pressure roller 14 is sufficiently clear of the cylinder 7 to allow a master sheet to be attached to the latter, or a change of master sheets.

Under these conditions, each pair of springs 24, 26 is tending to raise the rod 20 and associated bearing 12, but the rod is prevented from rising by the lock nuts 28 thereon, which engage the distance tube 35 below the trunnion 18, angular movement of the crank arm shaft 15 being prevented by suitable locating means associated with the operating lever 38.

Conveniently such means comprise a spring plunger 39 carried by the lever 38 and adapted to engage in succession as the lever is moved, a series of depressions 40 in the adjacent side member 5 or in a plate 41 secured to the latter. The "roller bar" condition above described occurs when the plunger 39 is in engagement with the uppermost depression 40.

If the operating lever 38 is moved in the direction of the arrow until the plunger 39 engages the next lower depression 40, cam surfaces 42, 43 on the levers 36, 38 co-operate to produce a slight upward movement of the crank arms 16, whereupon the springs 24, 26 on each rod 20 raise the latter as far as is permitted by the new position of the crank arms 16. Under these new conditions the pressure roller 14 may be in contact with the cylinder 7 but exerting virtually no pressure thereon.

On movement of the operating lever 38 to the third of its alternative positions and beyond, the cam surfaces 42, 43 separate and the thrust is transmitted to the lever 36 through the link 37, the angle between the two levers increasing progressively until the lever 38 has reached its other extreme position. As soon as the second or "no pressure" position of the lever 38 has been passed, and the pressure roller 14 is in contact with the cylinder 7, the trunnion 18 leaves behind the abutment 28 on the lower part of the rod 20, so that the latter is urged upwardly by the full pressure of the lower spring 26, whilst at the same time the pressure of the upper spring 24 on the abutment 25 is increased by the upward movement of the trunnion 18.

Preferably the operating gear is so arranged that equal movements of the lever 38 between the different stages of its adjustment produce a succession of decreasing angular movements of the crank arm shaft 15, so that the pressure exerted on the cylinder 7 by the pressure roller 14 is increased very gradually in a series of decreasing steps. In this case, the depressions 40 in the plate 41 which define the various alternative positions of the lever 38 will be unequally spaced and become progressively closer together as the "full pressure" position of the lever is approached.

In machines of the kind to which the present invention relates, as hitherto made, the pressure between the pressure roller and the cylinder has been capable of adjustment, but it has been necessary to use a tool such as a spanner for making such adjustment. For this reason there has been a tendency to use a rather heavy pressure such as is required with certain qualities of copy paper, and to neglect to make any adjustment of the pressure when using other qualities of copy paper which would permit of a lighter pressure being employed.

The present invention provides a means whereby adjustment of the pressure may be made without using tools, so that the operator is enabled quickly and without difficulty to adjust the pressure to suit the quality of the copy paper and the master sheet, the lightest pressure consistent with the production of good copies always being used, with the result that a much greater number of reproductions may be obtained for a given master sheet, and the effort of turning the cylinder is considerably reduced.

Furthermore, the provision of the knurled or milled heads 32 on the abutment sleeves 31, which are accessible by tilting the base 9 upwardly, enables the pressures of the lower springs 26 to be adjusted individually without the use of tools. In some cases, as when the copy sheet comprises a thick card which is passed between the cylinder 7 and pressure roller 14 otherwise than centrally, it may be desirable for the sake of obtaining the best reproduction to adjust the bearings 12 independently of each other, and the means above described greatly facilitates this operation.

What I claim then is:

1. A duplicating machine comprising a rigid frame, an impression cylinder rotatably mounted in said frame, a pressure roller disposed parallel to said cylinder and adapted to press moistened copy sheets against a master sheet carried by said cylinder, bearings for the ends of said pressure roller movably mounted in said frame, a shaft oscillatably mounted in said frame, an operator controlled lever system connected with said shaft for positively adjusting the latter from a no-pressure position in one direction to a release position and in the opposite direction to any selected one of several successive pressure positions, crank arms on said shaft, a trunnion carried by each crank arm, a rod slidable transversely through said trunnion and operatively engaging the adjacent bearing, a first abutment on said rod disposed at one side of and spaced from said trunnion, a second abutment on said rod on the opposite side of said trunnion for direct cooperation therewith, a first compression spring on said rod acting between said trunnion and said first abutment to urge said pressure roller with increasing force towards said cylinder as said shaft is adjusted from its no-pressure position towards its successive pressure positions, a second compression spring on said rod, and a stop for said second spring associated with said frame, said second spring acting between said stop and said other abutment to urge the latter into contact with said trunnion until said shaft has reached its no-pressure position, adjustment of said shaft from its no-pressure position to its release position causing said trunnion to act on said second abutment so as to displace the same and the associated rod and bearing against the force of said second spring to a position in which said pressure roller is clear of said cylinder.

2. A duplicating machine, as claimed in claim 1, in which said abutments on said rod are arranged for adjustment longitudinally thereof.

3. A duplicating machine, as claimed in claim 1, in which said rod is screw threaded and said abutments are nuts screwed on said rod at opposite sides of said trunnion.

4. A duplicating machine, as claimed in claim 1, in which said stop for said second spring includes an adjustment screw, said second spring acting between said screw and the other of said abutments.

5. A duplicating machine, as claimed in claim 1, in which said stop for said second spring includes a hollow adjustment screw forming a guide for said rod, said second spring acting between said screw and the other of said nuts.

6. A duplicating machine, as claimed in claim 1, in which said lever system includes an actuating lever fixed to said oscillatable shaft, a separate operating lever pivoted to said frame, and a mechanical connection between said levers such that on one extreme angular portion of said operating lever, said shaft assumes its release position whilst in the other extreme position of said operating lever the maximum pressure is exerted on said cylinder by said roller.

7. A duplicating machine, as claimed in claim 1, in which said lever system includes an actuating lever fixed to said oscillatable shaft, a separate operating lever pivoted to said frame, and a mechanical connection between said levers such that in one extreme position of said operating lever, said shaft assumes its release position and that equal angular movement of said operating lever towards the other extreme position produces decreasing angular movement of said shaft.

FRANK RONALD FORD.